US012584686B2

(12) United States Patent
Turney et al.

(10) Patent No.: US 12,584,686 B2
(45) Date of Patent: Mar. 24, 2026

---

(54) APPARATUS FOR PRECOOLING HYDROGEN FOR LIQUEFACTION USING EXTERNAL LIQUID NITROGEN AND HIGH PRESSURE GASEOUS NITROGEN

(71) Applicant: L'Air Liquide, Societe Anonyme pour l'Etude et l'Exploitation des Procedes Georges Claude, Paris (FR)

(72) Inventors: Michael A. Turney, Houston, TX (US); Alain Guillard, Houston, TX (US); Bobby Chan, Houston, TX (US)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 385 days.

(21) Appl. No.: 18/083,410

(22) Filed: Dec. 16, 2022

(65) Prior Publication Data

US 2023/0213278 A1      Jul. 6, 2023

Related U.S. Application Data

(60) Provisional application No. 63/295,509, filed on Dec. 30, 2021.

(51) Int. Cl.
*F25J 1/02* (2006.01)
*C01B 3/506* (2026.01)
(Continued)

(52) U.S. Cl.
CPC ............. *F25J 1/0234* (2013.01); *C01B 3/506* (2013.01); *C09K 5/041* (2013.01); *F25J 1/001* (2013.01);
(Continued)

(58) Field of Classification Search
CPC .. F25J 3/04084; F25J 3/04539; F25J 3/04296; F25J 3/04412; F25J 1/0072;
(Continued)

(56) References Cited

U.S. PATENT DOCUMENTS

| | | | |
|---|---|---|---|
| 2,983,585 A | 5/1961 | Smith | |
| 3,347,055 A | 10/1967 | Blanchard et al. | |

(Continued)

FOREIGN PATENT DOCUMENTS

| | | |
|---|---|---|
| JP | 2002-243360 | 8/2002 |

*Primary Examiner* — Frantz F Jules
*Assistant Examiner* — Webeshet Mengesha
(74) *Attorney, Agent, or Firm* — Justin K. Murray

(57) ABSTRACT

An integrated industrial unit is provided, which can include: a nitrogen source comprising an air separation unit that is configured to provide pressurized gaseous nitrogen and liquid nitrogen; a hydrogen source; a hydrogen liquefaction unit, wherein the hydrogen liquefaction unit comprises a precooling system, and a liquefaction system; and a liquid hydrogen storage tank, wherein the precooling system is configured to receive the gaseous hydrogen from the hydrogen source and cool the gaseous hydrogen to a temperature between 70K and 100K, wherein the precooling system comprises a primary refrigeration system and a secondary refrigeration system, wherein the liquefaction system is in fluid communication with the precooling system and is configured to liquefy the gaseous hydrogen received from the precooling system to produce liquid hydrogen, wherein
(Continued)

the liquid hydrogen storage tank is in fluid communication with the liquefaction system and is configured to store the liquid hydrogen received from the liquefaction system.

20 Claims, 6 Drawing Sheets

(51) Int. Cl.
  *C09K 5/04*     (2006.01)
  *F25J 1/00*     (2006.01)
(52) U.S. Cl.
  CPC ........... *F25J 1/0072* (2013.01); *F25J 1/0075* (2013.01); *F25J 1/0205* (2013.01); *F25J 1/0237* (2013.01); *F25J 1/0254* (2013.01); *C01B 2210/0009* (2013.01); *C01B 2210/0048* (2013.01); *C09K 2205/132* (2013.01); *F25J 2210/40* (2013.01); *F25J 2210/42* (2013.01); *F25J 2210/62* (2013.01); *F25J 2215/10* (2013.01); *F25J 2245/42* (2013.01); *F25J 2270/12* (2013.01); *F25J 2270/14* (2013.01); *F25J 2290/12* (2013.01)

(58) Field of Classification Search
  CPC .......... F25J 1/005; F25J 1/0237; F25J 1/0254; F25J 1/0075; F25J 1/0234; F25J 1/0205; F25J 1/0082; F25J 1/0037; F25J 1/0232; F25J 1/0227; F25J 1/0045; F25J 1/0225
  See application file for complete search history.

(56) References Cited

U.S. PATENT DOCUMENTS

| | | | |
|---|---|---|---|
| 2010/0272634 A1* | 10/2010 | Schwartz | C01B 3/0089 |
| | | | 422/187 |
| 2017/0038137 A1* | 2/2017 | Turney | F25J 1/0274 |
| 2018/0038638 A1* | 2/2018 | Guillard | F25J 1/0082 |
| 2020/0141640 A1* | 5/2020 | Turney | F25J 3/0655 |
| 2021/0270523 A1* | 9/2021 | Prosser | F25J 1/0022 |

* cited by examiner

APPARATUS FOR PRECOOLING HYDROGEN FOR LIQUEFACTION USING EXTERNAL LIQUID NITROGEN AND HIGH PRESSURE GASEOUS NITROGEN

CROSS REFERENCE OF RELATED APPLICATIONS

This application claims priority to U.S. Provisional Application Ser. No. 63/295,509 filed on Dec. 30, 2021, which is hereby incorporated by reference in its entirety.

TECHNICAL FIELD

The present invention generally relates to a method and apparatus for improving the operation of a hydrogen liquefaction unit.

BACKGROUND OF THE INVENTION

In the fight against global warming, hydrogen has been identified as a key molecule for producing sustainable energy. For large consumers of hydrogen, it is most economical to produce the hydrogen proximate the consumer, however, for consumers using applications such as fuel cells, it is simply not possible to connect or tie into existing hydrogen gas lines. As such, delivery of hydrogen in liquid form is seen to be the most viable alternative.

As is known, liquefied hydrogen requires extremely low temperatures, high pressures, and well-insulated storing materials in order to minimize the losses associated with boil-off gas, not only during transit and storage, but also during transfer between storage tanks. While these steps of the hydrogen market present their own challenges in the supply chain of deliverable hydrogen to the end user market, there are also efficiencies to be gained in the initial liquefaction of the hydrogen itself.

Therefore, the efficient liquefaction of hydrogen is of great importance in order for hydrogen to become an economically viable alternative to fossil fuels.

Hydrogen gas is typically generated from a feed gas such as natural gas or others using steam methane reforming (SMR), partial oxidation (PDX), or autothermal reforming (ATR). Some of these processes, such as the PDX, often require pressurized gaseous oxygen that is typically supplied by an air separation unit (ASU).

With reference to FIG. 1, which represents a hydrogen liquefaction unit (HLU) of the prior art, high pressure hydrogen gas 2 (e.g., 15-70 bara) is purified and dried and sent to a cold box 10 where it is cooled in a precooling heat exchanger 20 to approximately −180° C. to −190° C.

Refrigeration for this level of cooling is typically provided by nitrogen, either in a closed loop cycle (not shown) or externally provided LIN 52 from a nearby ASU 50. If using a nitrogen cycle, the nitrogen refrigeration cycle may include a single turbine, multiple turbines, and a turbine with booster(s) in addition to mechanical refrigeration unit utilizing ammonia or other refrigerant. Additionally, the nitrogen refrigeration cycle typically employs a multistage nitrogen recycle compressor to complete the closed loop.

In alternate methods (FIG. 1), this level of refrigeration (to between −180° C. and −190° C.) is provided by injecting a stream of liquid nitrogen (LIN) 62 into the exchanger 20 at approximately −190° C. This nitrogen stream vaporizes and is warmed to near ambient temperature as it exchanges cold with the hydrogen stream(s) 2, which are being cooled. The vaporized nitrogen can be extracted and introduced to gas/liquid separator 60, wherein gaseous nitrogen 64 is withdrawn and used to provide additional refrigeration to the heat exchanger 20. This alternative is less thermodynamically efficient due to large quantities of LIN being required to provide refrigeration over the entire temperature range (therefore typically only used for very small plants) and requires liquid nitrogen to be sourced from a separate nitrogen liquefier 50 (e.g., ASU), which would still require a cycle compressor and turbine boosters due to the large refrigeration demand.

The cooled gaseous hydrogen 22 is further cooled and liquefied in liquefaction heat exchanger 30 at approximately −252° C. by a second refrigeration cycle (not shown). Refrigeration for this level of cooling can be provided by a closed hydrogen (or helium, or helium/neon mixture) refrigeration cycle with multiple turbines and a hydrogen (or helium, or helium/neon mixture) recycle compressor. This hydrogen (or helium, or helium/neon mixture) compression is very difficult and expensive because of the low molecular weight (MW) or more specifically because these molecules are so small. Therefore it is known in the art to cool stream 22 to as cold temperature as possible in order to minimize expensive refrigeration required by hydrogen (or helium, or helium/neon mixture)

U.S. Pat. No. 2,983,585 (Smith) discloses a partial oxidation process in which methane is partially oxidized with oxygen to produce carbon monoxide and hydrogen gas. The partial oxidation process is integrated with a hydrogen liquefaction process in which hydrogen gas is pre-cooled by indirect heat exchange against liquid methane and subsequently further cooled against a closed external refrigerating cycle using liquid nitrogen ("LIN") as the refrigerant. The resultant methane is compressed at the warm end of the liquefaction process and then fed to the partial oxidation process. The resultant gaseous nitrogen is compressed at the warm end of the closed cycle before being condensed by indirect heat exchange with liquid methane and recycled. It is disclosed that the liquid methane could be replaced with liquefied natural gas ("LNG"). However, with this scheme this warm end refrigeration load is simply shifted from the hydrogen liquefier unit to the natural gas liquefaction unit. An additional heat exchange system between nitrogen and LNG is required incurring additional thermodynamic losses. In addition, the hydrogen stream is only cooled to approximately −150° C. due to the liquefaction temperature of LNG.

U.S. Pat. No. 3,347,055 (Blanchard et al.) discloses a process in which a gaseous hydrocarbon feedstock is reacted to produce hydrogen gas, which is then liquefied in an integrated liquefaction cycle. In one embodiment, the liquefaction cycle involves two closed refrigerant cycles, the first using hydrogen gas as a refrigerant and the second using nitrogen. Compression for both refrigeration cycles takes place at the warm end of the cycles. The hydrogen to be liquefied is also cooled by indirect heat exchange against a liquefied hydrocarbon feedstock gas thereby producing gaseous feedstock at 1 atm. (e.g., about 0.1 MPa) for use in the hydrogen production plant. It is disclosed that the hydrocarbon feedstock may be natural gas. This scheme also is shifting part of the refrigeration load from the hydrogen liquefier to the natural gas liquefier.

JP-A-2002/243360 discloses a process for producing liquid hydrogen in which hydrogen that is similar to U.S. Pat. No. 3,347,055 Blanchard, feed gas is pre-cooled by indirect heat exchange against a stream of pressurized LNG. The pre-cooled hydrogen gas is fed to a liquefier where it is further cooled by indirect heat exchange against both LIN and a refrigerant selected from hydrogen or helium. The further cooled hydrogen is then expanded to produce partially condensed hydrogen, which is separated into liquid hydrogen, which is removed and stored, and hydrogen vapor, which is recycled in the liquefier.

Quack discloses ("Conceptual Design of a High Efficiency Large Capacity Hydrogen Liquefier"; Adv. Cryog. Eng., Proc. CEC, Madison 2001, AIP, Vol. 613, 255-263) a hydrogen liquefier cycle that, to the inventors knowledge, most accurately represents the best current technology projections for hydrogen liquefaction cycles. It should be noted that Quack uses efficiency figures for compressors and turbines that are not achievable at present, but which are thought to be realistic for the future.

Current hydrogen liquefaction processes consume power at a rate of about 11 kWh/kg (liquid hydrogen) based on a gaseous hydrogen feed at a typical pressure of 2.5 MPa (25 bar). Quack ("Conceptual Design of a High Efficiency Large Capacity Hydrogen Liquefier"; Adv. Cryog. Eng., Proc. CEC, Madison 2001, AIP, Vol. 613, 255-263) suggests that the best future power consumption will be in the range 5 to 7 kWh/kg (liquid hydrogen) if his suggested improvements are utilized.

This scheme involves pre-cooling the hydrogen to about −53° C. by indirect heat exchange with propane, ammonia, fluorocarbons or other refrigerants. The hydrogen is then further cooled and liquefied in two or more steps by indirect heat exchange against a mixture of helium and neon. The use of neon increases the molecular weight of the refrigerant mixture making it easier for the recycle compressor and thereby reducing compression energy (generally 75% He of MW=4 and 25% Ne of MW=20 having a mixture of MW=8). However, the use of neon in the mixture also prevents the temperature level of the refrigerant from achieving the very cold temperatures (−252° C.) required for the liquefaction of hydrogen. In addition, helium and neon must be sourced and its composition in the neon/helium mixture carefully managed. In addition, this refrigerant must be compressed specifically and solely for the purpose of the hydrogen liquefaction energy.

It is an object of the present invention to develop a scheme, which provides a process and apparatus for improving the efficiencies of the hydrogen liquefaction unit, particularly the precooling of hydrogen to between −180 C and −190 C.

BRIEF SUMMARY OF THE INVENTION

The present invention is directed to a device and a method that satisfies at least one of these needs. One objective of the current invention is to improve the refrigeration section for the precooling portion (e.g., 300K to about 80K) of the hydrogen liquefaction process, while also minimizing the number of rotating equipment (e.g., compressors and turbine boosters). In certain embodiments, the invention can include integration of an air separation unit (ASU), a hydrogen generation unit (HGU), which can include, but is not limited to, auto-thermal reformer (ATR) and partial oxidation reactor (PDX), and a hydrogen liquefaction unit (HLU), wherein the ASU provides pressurized gaseous oxygen to the HGU, and the HGU provides gaseous hydrogen to the HLU. The HLU includes a precooling unit having a primary refrigeration system and a secondary refrigeration system, and a liquefaction system. The precooling unit is configured to cool the hydrogen to approximately 80K, while the liquefaction unit is configured to cool and liquefy the hydrogen to a temperature suitable for liquefaction of the hydrogen as is known in the art.

In an additional embodiment, the ASU can provide liquid nitrogen to the HLU, preferably for use as the refrigerant for the secondary refrigeration system of the precooling step.

In certain embodiments, the integrated system of ASU, HLU, and HGU includes a single air compressor while providing refrigeration to the HLU at the ~80K level without using a cycle compressor (i.e., compressor using external power). In another embodiment, it is preferred to provide liquid nitrogen (LIN) for vaporization within the precooling unit of the HLU.

In one embodiment, a method for liquefaction of hydrogen in a hydrogen liquefaction unit is provided. The method can include the steps of: introducing a hydrogen stream into a precooling system under conditions effective for cooling the hydrogen stream to a temperature of between about 70K and about 100K, more preferably between about 80K and about 90K to produce a cooled hydrogen stream, wherein the precooling system comprises a primary refrigeration system and a secondary refrigeration system; introducing the cooled hydrogen stream to a liquefaction system under conditions effective for liquefying the cooled hydrogen stream to produce liquid hydrogen; and withdrawing the liquid hydrogen from the liquefaction system, wherein the primary refrigeration system provides refrigeration by expansion of a pressurized gaseous nitrogen stream that is sourced from an air separation unit, wherein the secondary refrigeration system provides refrigeration by vaporization of a liquid nitrogen stream that is sourced from the air separation unit.

In optional embodiments of the method for liquefaction of hydrogen in a hydrogen liquefaction unit:

the hydrogen stream is sourced from a hydrogen generation unit;

a ratio of a flow rate of the pressurized gaseous nitrogen stream to a flow rate of the liquid nitrogen stream is between 0 to 40, more preferably 10 to 40;

the primary refrigeration system is configured to provide cooling within the precooling system to a first temperature between about 70K and about 120K;

the first temperature is less than about 30K of a vaporization temperature of liquid nitrogen used within the secondary refrigeration system;

the secondary refrigeration system is configured to provide cooling within the precooling system to a temperature of between about 70K and about 100K;

the vaporization of liquid nitrogen in the secondary refrigeration system occurs at a vaporization pressure that is less than a discharge pressure of a cold turbine used within the primary refrigeration system;

the method can also include the step of providing the air separation unit and a hydrogen generation unit, wherein the air separation unit is configured to produce an oxygen stream, the pressurized gaseous nitrogen stream, and the liquid nitrogen stream, wherein the air separation unit is in fluid communication with the hydrogen generation unit and the secondary refrigeration system, such that the air separation unit is configured to send the oxygen stream to the hydrogen generation unit, the pressurized nitrogen gaseous stream to the primary refrigeration system, and the liquid nitrogen to the secondary refrigeration system;

the liquid nitrogen has a flow rate between about 5% to about 50% of a flow rate of the oxygen stream sent to the hydrogen generation unit;

the method can also include the step of recycling a vaporized nitrogen stream from the hydrogen liquefaction unit to the air separation unit;

the oxygen stream is at a pressure greater than 20 bar(a), and the pressurized gaseous nitrogen stream is at a pressure of greater than 10 bar(a);

the oxygen stream is cold compressed prior to vaporization in the ASU; and/or the pressurized gaseous nitrogen stream is cold compressed prior to vaporization in the ASU.

In another embodiment, an integrated industrial unit is provided, which can include: a nitrogen source configured to provide liquid nitrogen and pressurized gaseous nitrogen; a hydrogen source configured to provide gaseous hydrogen at a pressure of at least 15 bar(a); a hydrogen liquefaction unit, wherein the hydrogen liquefaction unit comprises a precooling system, and a liquefaction system; and a liquid hydrogen storage tank, wherein the precooling system is configured to receive the gaseous hydrogen from the hydrogen source and cool the gaseous hydrogen to a temperature between 70K and 100K, wherein the precooling system comprises a primary refrigeration system and a secondary refrigeration system, wherein the liquefaction system is in fluid communication with the precooling system and is configured to liquefy the gaseous hydrogen received from the precooling system to produce liquid hydrogen, wherein the liquid hydrogen storage tank is in fluid communication with the liquefaction system and is configured to store the liquid hydrogen received from the liquefaction system, wherein the primary refrigeration system provides refrigeration by expansion of a pressurized gaseous nitrogen stream, wherein the secondary refrigeration system provides refrigeration by vaporization of a liquid nitrogen stream, wherein the nitrogen source is an air separation unit.

In optional embodiments of the integrated industrial unit:

the hydrogen source is a hydrogen generation unit;

the air separation unit is configured to produce an oxygen stream, the pressurized gaseous nitrogen, and the liquid nitrogen, wherein the air separation unit is in fluid communication with the hydrogen generation unit and the secondary refrigeration system, such that the air separation unit is configured to send the oxygen stream to the hydrogen generation unit and the liquid nitrogen to the secondary refrigeration system;

the integrated industrial unit can also include a flow controller configured to control a flow rate of the liquid nitrogen such that the flow rate of the liquid nitrogen from the nitrogen source is between 5 to 50% of a flow rate of the oxygen stream sent to the hydrogen generation unit;

the air separation unit is configured to receive a recycled vaporized nitrogen stream from the hydrogen liquefaction unit;

the air separation unit comprises a high pressure feed air compressor (i.e., greater than 10 bar(a), preferably greater than 15 bar(a));

the primary refrigeration system is configured to provide cooling within the precooling system to a first temperature between about 70K and about 120K;

the first temperature is less than about 30K of a vaporization temperature of liquid nitrogen used within the secondary refrigeration system;

the secondary refrigeration system is configured to provide cooling within the precooling system to a temperature between about 70K and about 100K, more preferably between about 80K and about 90K;

the vaporization of liquid nitrogen in the secondary refrigeration system occurs at a vaporization pressure that is less than a discharge pressure of a cold turbine used within the primary refrigeration system; and/or the air separation unit further includes an oxygen pump and a nitrogen pump, the oxygen pump being configured to pressurize liquid oxygen, the nitrogen pump being configured to pressurize liquid nitrogen, wherein the oxygen pump and the nitrogen pump are both separately fluidly connected with a main heat exchanger of the air separation unit that is configured to vaporize the liquid oxygen and the liquid nitrogen.

In another embodiment, the integrated industrial unit can include: a nitrogen source configured to provide liquid nitrogen and pressurized gaseous nitrogen; a hydrogen source configured to provide gaseous hydrogen at a pressure of at least 15 bar(a); a hydrogen liquefaction unit, wherein the hydrogen liquefaction unit comprises a precooling system, and a liquefaction system; and a liquid hydrogen storage tank, wherein the precooling system is configured to receive the gaseous hydrogen from the hydrogen source and cool the gaseous hydrogen to a temperature between 70K and 100K, wherein the precooling system comprises a primary refrigeration system and a secondary refrigeration system, wherein the liquefaction system is in fluid communication with the precooling system and is configured to liquefy the gaseous hydrogen received from the precooling system to produce liquid hydrogen, wherein the liquid hydrogen storage tank is in fluid communication with the liquefaction system and is configured to store the liquid hydrogen received from the liquefaction system, wherein the primary refrigeration system comprises compressors and expanders configured to compress and expand, respectively, the pressurized gaseous nitrogen, wherein the expanders are configured to have an outlet pressure of $P_1$, wherein the secondary refrigeration system provides refrigeration to the precooling system by vaporization of liquid nitrogen at pressure $P_2$, wherein the nitrogen source comprises an air separation unit In optional embodiments of the integrated industrial unit:

$P_1$ is substantially equal to $P_2$;

the hydrogen source is a hydrogen generation unit;

the air separation unit is configured to produce an oxygen stream, the pressurized gaseous nitrogen, and the liquid nitrogen, wherein the air separation unit is in fluid communication with the hydrogen generation unit and the secondary refrigeration system, such that the air separation unit is configured to send the oxygen stream to the hydrogen generation unit and the liquid nitrogen to the secondary refrigeration system;

the integrated industrial unit can also include a flow controller configured to control a flow rate of the liquid nitrogen such that the flow rate of the liquid nitrogen from the nitrogen source is between 0 to 50% of a flow rate of the oxygen stream sent to the hydrogen generation unit;

the primary refrigeration system is configured to provide cooling within the precooling system to a first temperature between about 70K and about 120K;

the first temperature is less than about 30K of a vaporization temperature of liquid nitrogen used within the secondary refrigeration system;

the secondary refrigeration system is configured to provide cooling within the precooling system to a temperature of about 80K to about 90K;

the vaporization of liquid nitrogen in the secondary refrigeration system occurs at a vaporization pressure that is less than or equal to a discharge pressure of a cold turbine used within the primary refrigeration system; and/or the air separation unit further comprises an oxygen pump and a nitrogen pump, the oxygen pump being configured to pressurize liquid oxygen, the nitrogen pump being configured to pressurize liquid nitrogen, wherein the oxygen pump and the nitrogen pump are both separately fluidly connected with a main heat exchanger of the air separation unit that is configured to vaporize the liquid oxygen and the liquid nitrogen.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Certain embodiments of the invention can include integration of an air separation unit (ASU), a hydrogen generation unit (HGU), and a hydrogen liquefaction unit (HLU), wherein the ASU provides pressurized gaseous oxygen to the HGU, and the HGU provides gaseous hydrogen to the HLU. The HLU includes a precooling unit having a primary refrigeration system and a secondary refrigeration system, and a liquefaction system. The precooling unit is configured to cool the hydrogen to approximately 80K, while the liquefaction unit is configured to cool and liquefy the hydrogen.

Figure 1:
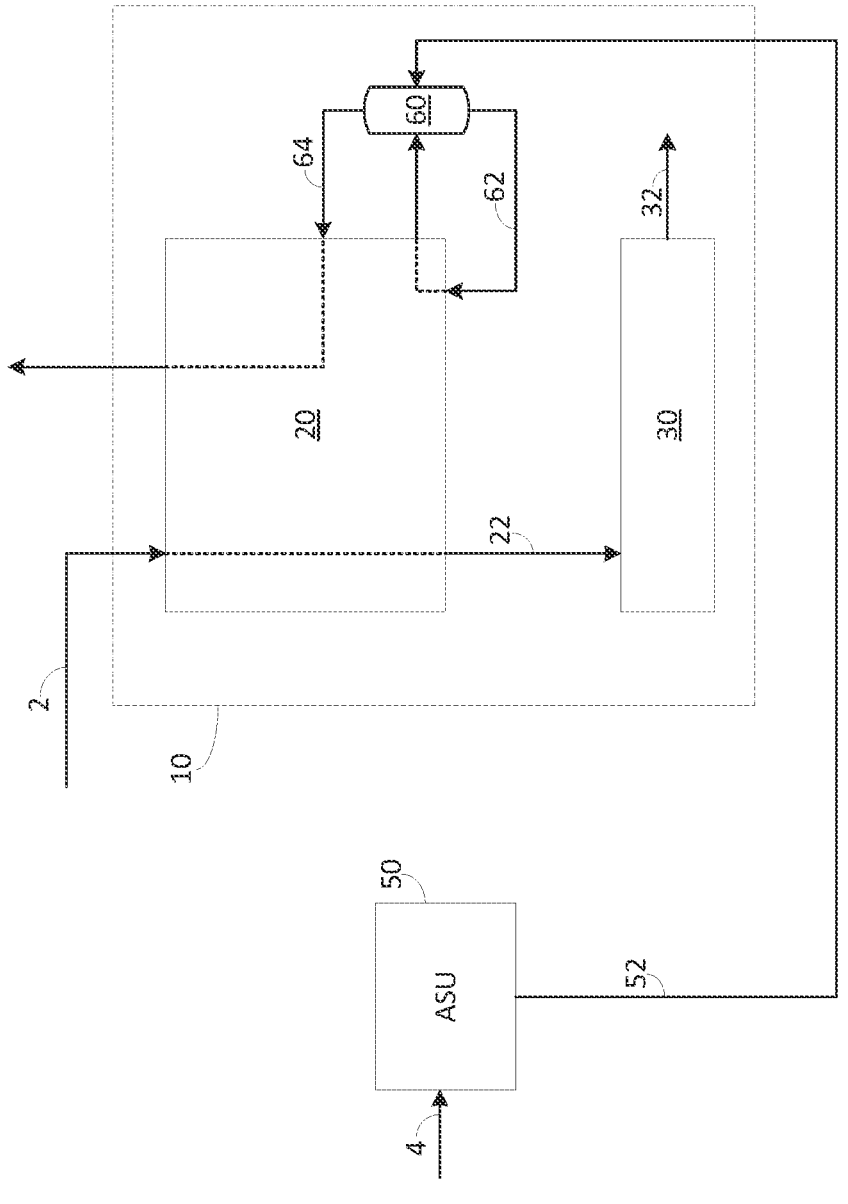
FIG. 1 is a process flow diagram of an embodiment of the prior art.
Figure 2:
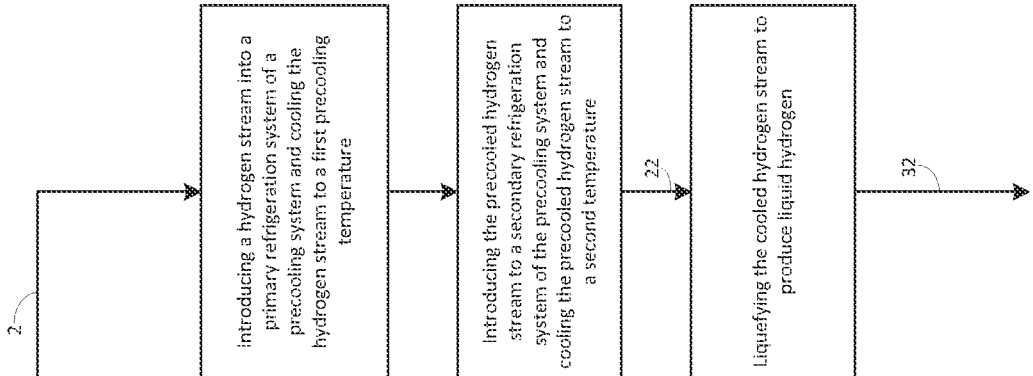
FIG. 2 is flow chart in accordance with an embodiment of the present invention.

FIG. 2 provides a flow chart in accordance with an embodiment of the present invention. A hydrogen feed stream 2 is introduced into a primary refrigeration system of a precooling system and cooling the hydrogen stream to a first precooling temperature. From there, the precooled hydrogen stream is then introduced to a secondary refrigeration system of the precooling system and cooling the precooled hydrogen stream to a second temperature. Next, the cooled hydrogen stream 22 is then liquefied in the liquefaction system to produce liquid hydrogen 32.

Air Separation Unit

The ASU products of pressurized gaseous oxygen (GOX) and gaseous nitrogen (GAN) are often produced by pumping and vaporizing at high pressure in a main heat exchanger by heat exchange with another condensing stream (typically air). These pumping and vaporizing systems are typically less expensive compared to external GOX and nitrogen compression equipment.

Similarly, for other ASU process cycles, refrigeration to produce incremental LIN can be available at very low cost relative to other operations such as the precooling portion of a hydrogen liquefier. In one example, the specific power of incremental LIN is only 0.3 kW/Nm3 from the ASU but 0.6 kW/Nm3 in the HLU.

Hydrogen Liquefaction Unit

Hydrogen liquefaction processes require refrigeration over a very wide temperature range (300K to 20K). It is common to have separate dedicated refrigeration systems for the warm end (300K to 80K) and the cold end (80K to 20K) since the specific refrigeration demands and cost vary significantly with temperature. Regarding the warm temperature range (300K to 80K): existing technology uses a) closed loop N2 cycle, b) vaporization of LIN from an ASU, or c) mixed or single hydrocarbon refrigerant.

Additionally, for small liquefiers where OPEX is less important, refrigeration for the full temperature range of 300K to 80K can be achieved by providing LIN from either local ASU or merchant, and vaporizing in the main exchanger. Although LIN can provide efficient refrigeration in the temperature range somewhat above 80K, it is not thermodynamically efficient for LIN to provide this complete temperature range up to 300K. As a result, this is typically limited to small liquefiers due to the extremely large quantities of LIN required making this unfeasible for large liquefiers.

In embodiments that use a nitrogen refrigeration cycle, the $N_2$ refrigeration cycle involves compression of $N_2$, partial cooling and expansion in dual turbine boosters. A portion of the high pressure $N_2$ is further cooled and expanded to 1.2 to 2 bar(a) with a JT valve forming LIN, which is then vaporized providing refrigeration to the cooling streams at ~80K. It is desirable for this LIN vaporization pressure to be as low as possible (e.g., 1.2 bar(a)) to provide the coldest temperature level, which is typically limited by pressure drop to rewarm and feed a low-pressure flash gas compressor. However, it is desirable to have a solution without the additional feed/flash gas compressor.

In a preferred embodiment, the turbine outlet pressure can be equalized with the vaporized LIN pressure, thereby yielding a single stream, which can be compressed and recycled to the turboexpanders using a single compressor. However, this requires a large low-pressure compressor.

In a preferred embodiment, the ASU provides high-pressure oxygen (e.g., 30-40 bar(a)) to the HGU, pressurized gaseous nitrogen ("HPGAN") (e.g., 10-70 bar(a)), which is formed by pumping and vaporizing nitrogen within the ASU, and liquid nitrogen (LIN). In certain embodiments, the LIN is in a flow range of 15-50% of oxygen separation to the HLU, more preferably 25-40%. LAR can also optionally be produced.

In a preferred embodiment, vaporization of the LIN and turbo-expansion of the HPGAN provides refrigeration for the precooling refrigeration (~300K to ~80K) of the HLU. The vaporized LIN and expanded GAN can be combined and vented to the atmosphere.

In certain embodiments, the LIN and GAN sent to the HLU is used for refrigeration purposes only, and therefore, high purity nitrogen is not required. For example, purities of <1% O2 as limited by margin to lower explosive limit of $H_2$ is sufficient.

In certain embodiments, the quantity of GOX from the ASU to the HGU can be proportional to the quantity of $H_2$ produced and liquefied. Also, the quantity of LIN to be vaporized and HPGAN to be expanded can be a function of the LH2. For example, the ratio of the HPGAN/LIN can be optimized/adjusted based on their production costs from the ASU relative to their refrigeration value in order to optimize the HLU. Both the expanded GAN, as well as vaporized LIN can be warmed and vented to the atmosphere, which therefore determines the pressure and thus temperature of vaporization as well as the coldest temperature from the turbine before liquid formation.

Regarding refrigeration value to the HLU, in certain embodiments, the HPGAN/LIN ratio is in the range of 15-40 (e.g., 15 to 30 for turbines in series or 30 to 40 for turbines in parallel where there is lower HPGAN pressure from the ASU).

There is potential for OPEX savings in addition to the CAPEX savings of compressors, turbo-expander equipment and heat exchange area. The optimization is based on the balance of the specific power for LIN and HPGAN produced by the ASU vs the relative refrigeration values in the HLU.

In a preferred embodiment, LIN in the flow range of 15 to 50% of $O_2$ separation to the HGU, more preferably 25% to 40% of $O_2$ separation, provides an optimum to de-couple the vaporized LIN from the $N_2$ refrigeration cycle, increasing the pressure of the turbine discharge, thus improving the process.

As indicated in Table 1 below, the power savings for producing 85 Mtd of LH2 is about 1,300 kW, which is about a 1.24% in energy savings.

TABLE 1

Figure 5:
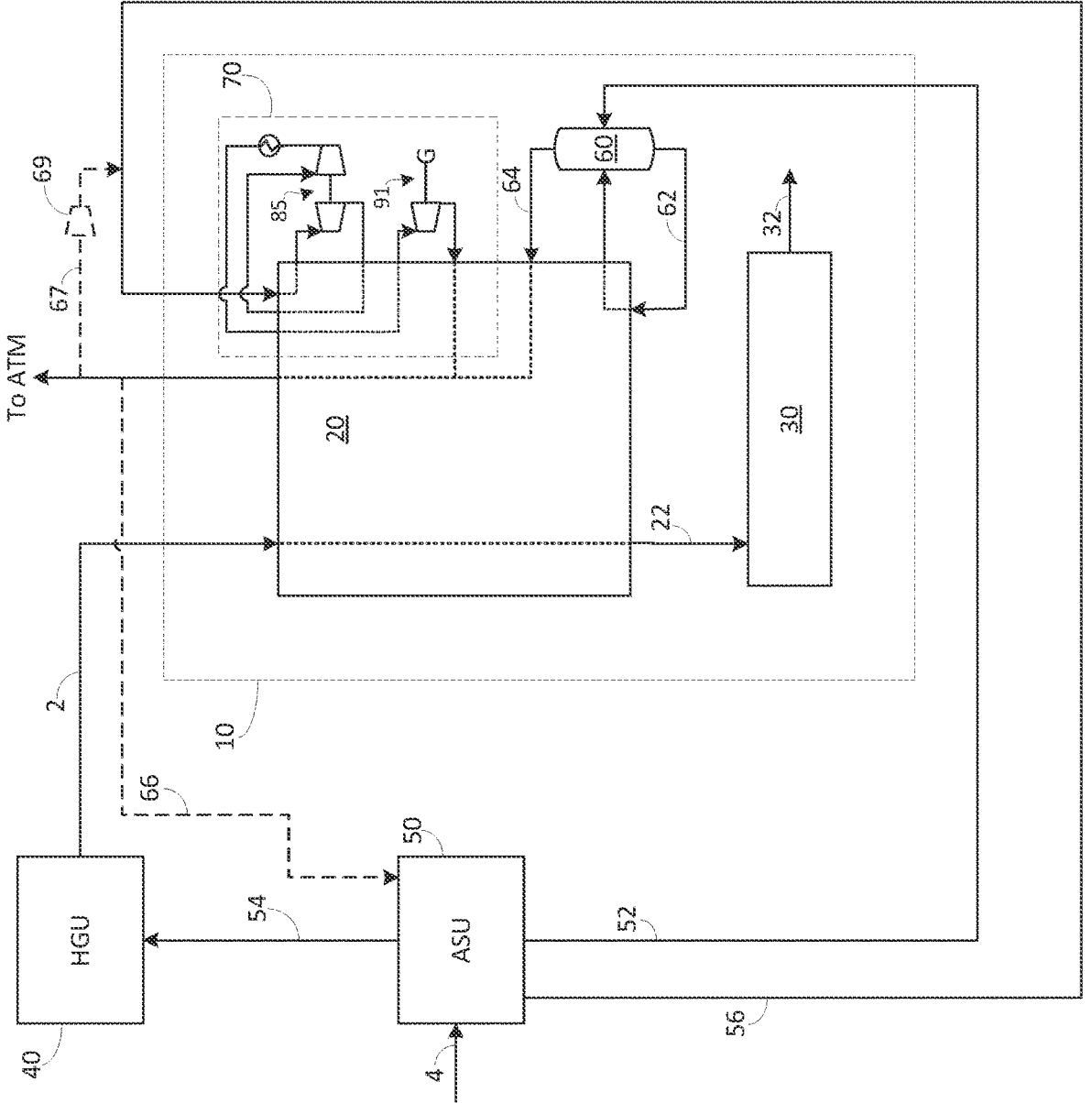
FIG. 5 is a schematic diagram of a third embodiment of the present invention

| | Independent HLU | FIG. 5 |
|---|---|---|
| LH2 (Mtd) | 85 | 85 |
| LIN TO HLU (Mtd) | 0 | 90 |
| LIN prod (Mtd) | 0 | 0 |
| HPGAN to HLU (Mtd) | 0 | 2,076 |
| N2/air flow (%) | — | 12.4 |
| HPGAN/LIN | — | 23.1 |
| ASU: Compression, kW | 72,092 | 81,415 |
| ASU: misc (kW) | 1,044 | 1,243 |
| ASU total (kW) | 73,136 | 82,658 |
| HLU: N2 compressor (kW) | 10,980 | 0 |

10

TABLE 1-continued

| | Independent HLU | FIG. 5 |
|---|---|---|
| HLU: LPH2 compressor (kW) | 6,298 | 6,308 |
| HLU: HPH2 compressor (kW) | 16,423 | 16,544 |
| HLU total (kW) | 33,701 | 22,852 |
| Total ASU + HLU (kW) | 106,837 | 105,510 |
| Delta | — | 1,327 |
| Delta (%) | — | 1.24% |

Figure 3:
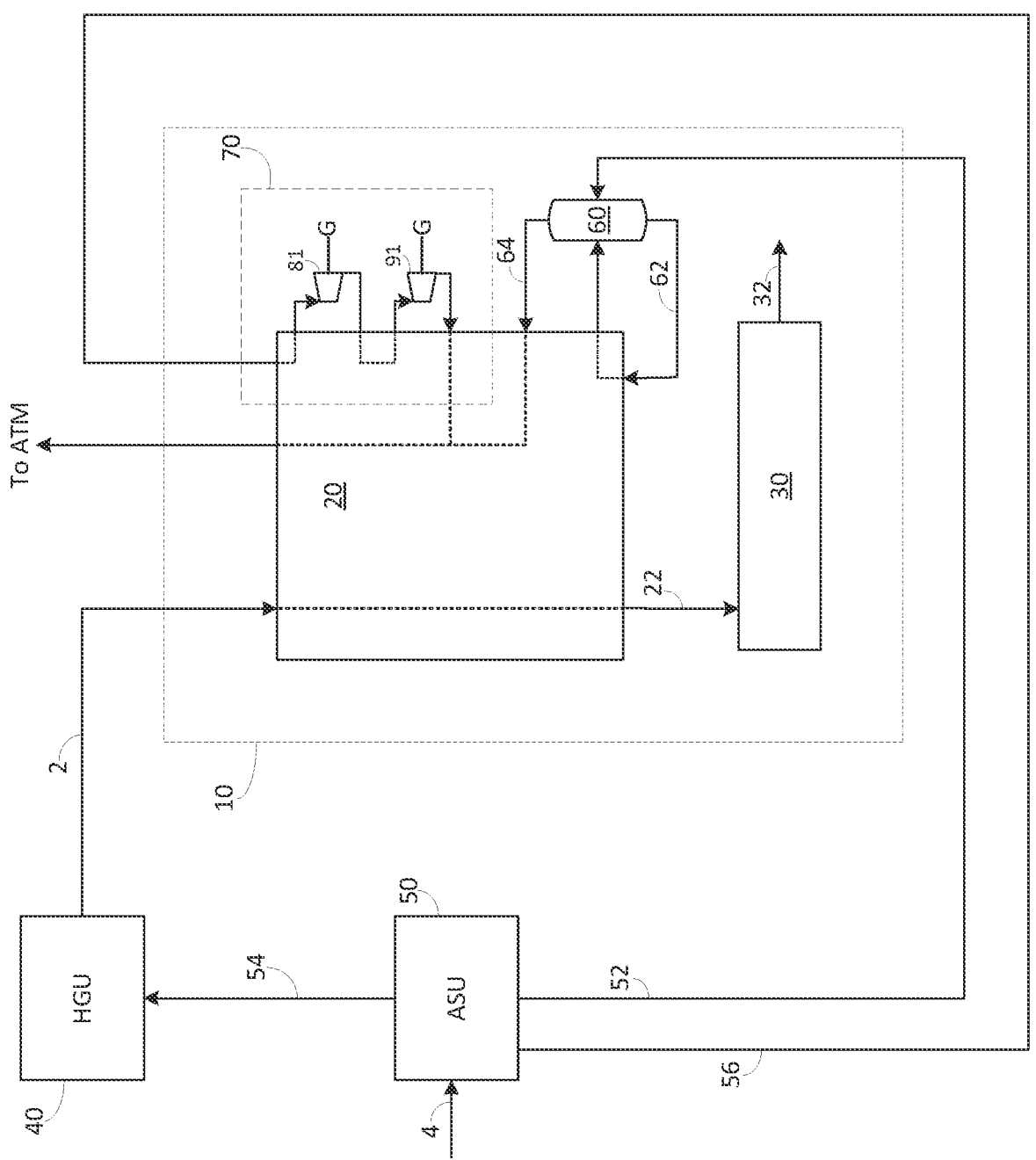
FIG. 3. is a schematic diagram of an embodiment of the present invention.

FIG. 3 provides a schematic process view of an embodiment of the present invention in which an HLU 10 is integrated with both an HGU 40 and an ASU 50. In the embodiment shown, an air feed 4 is introduced into ASU 50 in order to produce liquid nitrogen 52, gaseous oxygen 54, and pressurized gaseous nitrogen (HPGAN) 56. Gaseous oxygen 54 is then introduced into HGU 40, which can be an SMR, ATR, PDX or the like, wherein a feed stream (not shown) is used along with gaseous oxygen 54 to produce high-pressure hydrogen 2 using methods known in the art.

HLU 10 preferably comprises a precooling system 20, a liquefying system 30, a primary refrigeration system 70, a secondary refrigeration system (60, 62,64), and a thermal insulator such as a cold-box 10, which provides thermal insulation for certain equipment within HLU 10 that will be exposed to temperatures below freezing. Precooling system 20 and liquefying system 30 preferably include heat exchangers configured to operate at cryogenic temperatures and exchange heat between two or more stream via indirect heat exchange. The types of heat exchangers used in certain embodiments can be chosen appropriately by one of ordinary skill in the art.

High-pressure hydrogen 2 is then introduced to HLU 10, wherein it is first cooled in precooling section 20 to a temperature of about 80K to form cooled hydrogen stream 22. This stream 22 is then sent to liquefying system 30 under conditions effective for liquefying the cooled hydrogen stream 22 to produce liquid hydrogen 32, which is withdrawn as a product stream.

Refrigeration for liquefying system 30 can be provided by a closed hydrogen (or helium) refrigeration cycle with multiple turbines and a hydrogen (or helium) recycle compressor. This hydrogen (or helium) compression is very difficult and expensive because of the low molecular weight (MW) or more specifically because these molecules are so small.

Those of ordinary skill in the art will also recognize that production of liquid hydrogen requires other steps (e.g., adsorption systems, ortho-para conversion) which are not described herein as they are not impacted by embodiments of the current invention.

Refrigeration needed to provide the cooling to produce cooled hydrogen stream 22 is provided by primary refrigeration system 70 and secondary refrigeration system 60, 62, 64. In the embodiment shown in FIG. 3, primary refrigeration system includes use of HPGAN 56 from the ASU. In the embodiment shown, HPGAN 56 is slightly cooled before being expanded across first and second turbines 81, 91, which can each connected to a generator G or oil brake system (not shown). After the final expansion in second turbine, the low-pressure gaseous nitrogen (LPGAN) is then warmed in the precooling section before being either captured for further use or vented to the atmosphere. As the HPGAN 56 is already under pressure coming from the ASU, no additional power is used in providing the primary refrigeration.

In the embodiment shown, secondary refrigeration system comprises vaporizing LIN 52 received from ASU 50. In this embodiment, LIN 52 is introduced to gas/liquid separator 60 wherein the liquid nitrogen 62 is withdrawn from a bottom portion of gas/liquid separator 60 and warmed in precooling section 20, wherein it is then withdrawn and sent back to gas/liquid separator 60. Gaseous nitrogen 64 is withdrawn from a top portion of gas/liquid separator 60 before being sent to precooling section 20 for warming therein. Gaseous nitrogen is withdrawn from the warm end of the precooling section 20 and either captured for further use or vented to the atmosphere.

Figure 4:
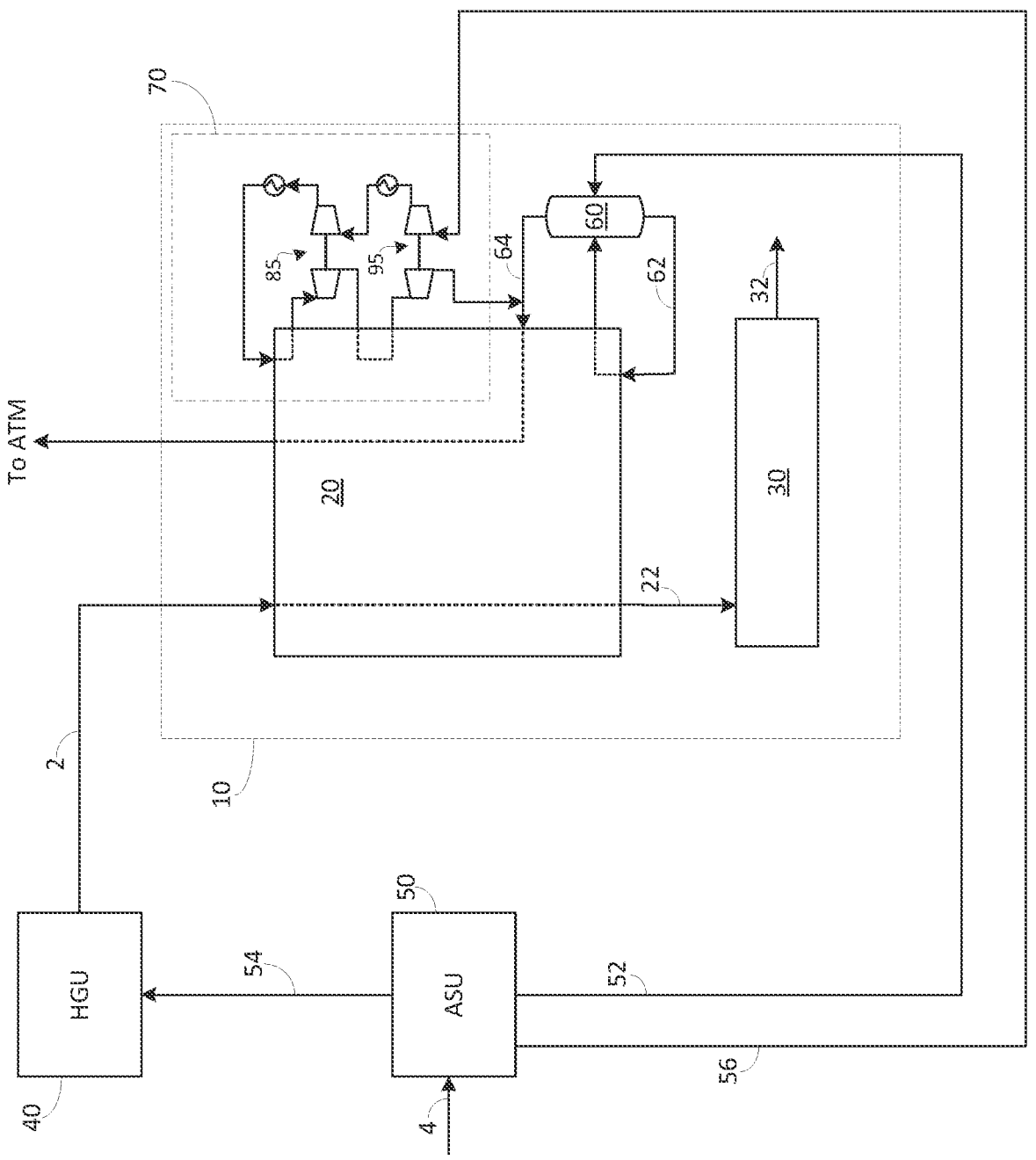
FIG. 4 is a schematic diagram of a second embodiment of the present invention.

FIG. 4 provides a second embodiment that is similar to the embodiment of FIG. 3, with the difference being an upgraded primary refrigeration system 70. In this embodiment, primary refrigeration system 70 includes first and second turbo-boosters 85, 95. HPGAN 56 is first compressed in second booster before being further compressed in first booster 85. This embodiment allows for greater refrigeration production as compared to the embodiment shown in FIG. 3; however, no additional power is generated by generators.

FIG. 5 provides a schematic representation of a third embodiment that is a pseudo-hybrid of the embodiments shown in FIGS. 3 and 4. Notably, the primary refrigeration system 70 include first turbo-booster 85 of FIG. 4 and second turbine 91 and generator G of FIG. 3. HPGAN 56 is first expanded in first turbine 85, before being warmed in the heat exchanger and then compressed in first booster of the first turbo-booster 85. This booster stream is then cooled and subsequently expanded by second turbine 91, wherein the expanded nitrogen is warmed again before being vented to the atmosphere or being recycled back to the ASU via stream 66. As non-limiting examples, this low-pressure nitrogen stream 66 can be used to precool the air stream or regenerate the dryer. In another optional embodiment, a portion of the warmed and expanded nitrogen 67 can be recycled to the primary refrigeration section 70 after being compressed in nitrogen compressor 69. This is particularly advantageous when there is a desire for more flow through the HLU $N_2$ turbines (i.e., to generate more refrigeration in the HLU) while keeping the flow of HPGAN from the ASU at a reduced flow rate for optimization of the ASU.

The embodiment shown in FIG. 5 allows for greater refrigeration production as compared to the embodiment shown in FIG. 3, while also producing more power as compared to FIG. 4.

Figure 6:
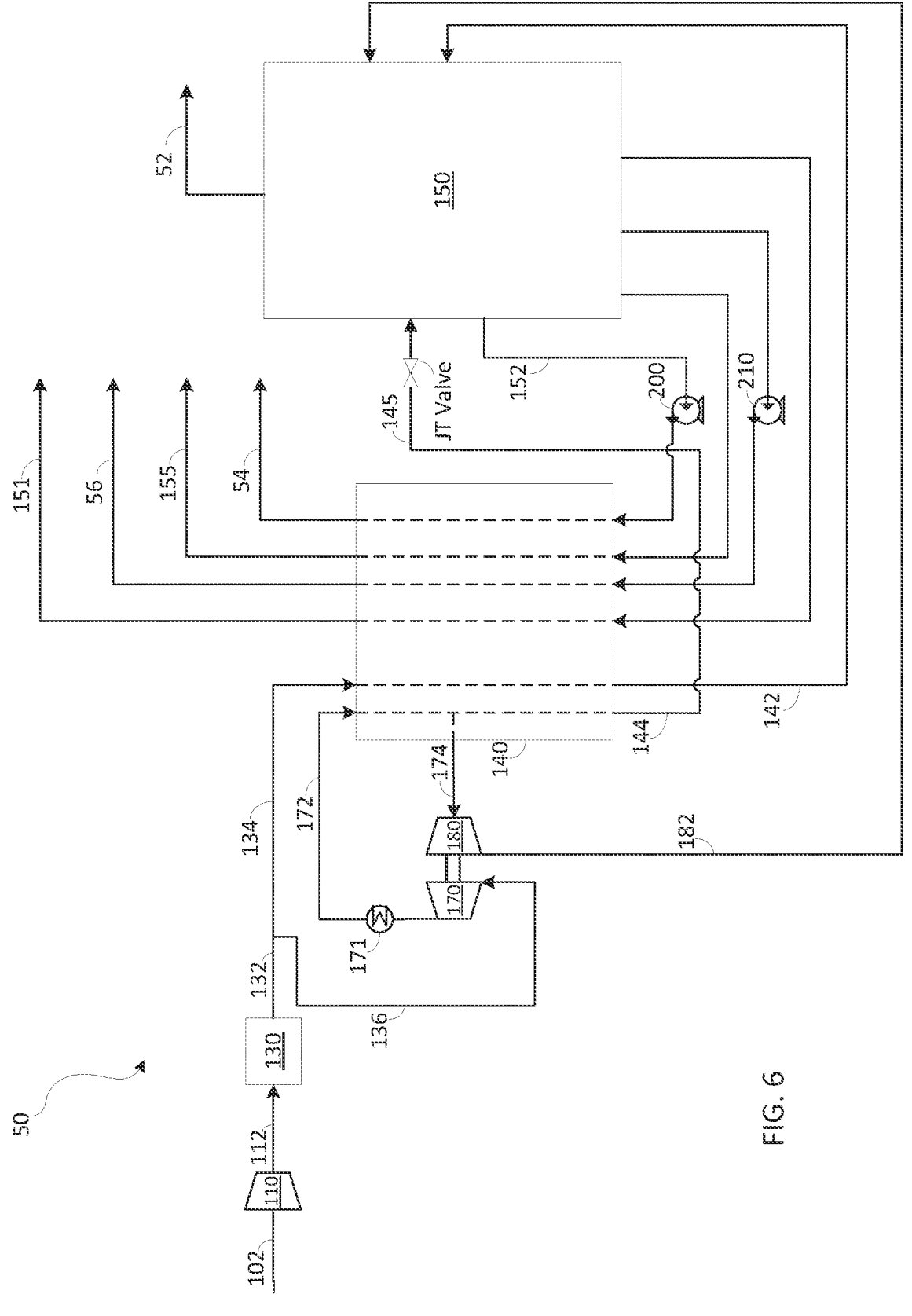
FIG. 6 is a schematic diagram of an Air Separation Unit in accordance with an embodiment of the present invention.

FIG. 6 provides a detailed view of an embodiment using high-pressure (>15 bar(a)) main air compressor type ASU in accordance with an embodiment of the present invention, in which the ASU also includes a turbo booster 170, 180. Referring to FIG. 3, first air stream 102 is compressed in first MAC 110 to form compressed stream 112, before being fed to front-end purification unit (FEP) 130 to remove components that might freeze at cryogenic temperatures (e.g., water and carbon dioxide). The MAC preferably pressurizes stream 112 to an appropriate pressure level as is known by those of ordinary skill in the art, such that first portion 134 can be appropriately separated in the distillation column system 150. While the embodiment described in FIG. 6 includes a high-pressure main air compressor, those of ordinary skill in the art will readily understand that certain embodiments are not meant to be so limited. Rather, certain embodiments can include any acceptable ASU that is capable of producing the needed nitrogen refrigeration streams. This can include, but is not limited to, low pressure MAC (4 to 7 bara(a) discharge) with separate booster air compressor (BAC) for providing the product compression and liquefaction energy.

In the embodiment shown that includes turbo booster 170, 180, purified air stream 132 is split into a first portion 134 and a second portion 136. First portion 134 is kept at substantially the same pressure as the discharge of the MAC (minus pressure losses inherent in piping and equipment) and then introduced into a warm end of the main heat exchanger 140. After cooling in main heat exchanger 140, cooled first stream 142 is then introduced into distillation column system 150 for separation therein.

Second portion 136 is further compressed in warm booster 170 to form boosted stream 172. The embodiment shown preferably includes cooler 171 in order to remove heat of compression from boosted stream 172 prior to introduction to main heat exchanger 140. In the embodiment shown, warm booster 170 is coupled to turbine 180; thereby forming what is commonly referred to as a turbo-booster, which allows for the spinning of the turbine 180 to power the warm booster 170.

Boosted stream 172 can then be sent to main heat exchanger 140 for cooling, wherein first portion 174 is withdrawn at an intermediate location and then expanded in turbine 180 to form expanded air 182, which is then introduced to distillation column system 150 for separation therein. Second portion 144 is fully cooled in heat exchanger 140 and then expanded across a Joule-Thompson valve 145 to produce additional refrigeration for the system before being introduced to the distillation column system for separation therein.

In the embodiment shown, distillation column system 150 is configured to provide a waste nitrogen stream 151, pressurized gaseous nitrogen stream 56 (which is preferably provided by pumping liquid nitrogen from the distillation column system 150 using nitrogen pump 210 before vaporizing the liquid nitrogen the main ASU exchanger), a low-pressure nitrogen stream 155 and a high-pressure gaseous oxygen stream 54. In the embodiment shown, liquid oxygen 152 is withdrawn from the sump of the lower-pressure column (not shown) and pressurized in pump 200 before being heated in main heat exchanger 140 to form high-pressure gaseous oxygen stream 54. Liquid nitrogen product 52 can also be withdrawn from the distillation column system.

Those of ordinary skill in the art will recognize that the distillation column system 150 can be any column system that is configured to separate air into at least a nitrogen-enriched stream and an oxygen-enriched stream. This can include a single nitrogen column or a double column having a higher and lower pressure column, as is known in the art. In another embodiment, the distillation column system can also include other columns such as argon, xenon, and krypton columns. As all of these columns and systems are well known in the art, Applicant is not including detailed figures pertaining to their exact setup, as they are not necessary for an understanding of the inventive aspect of the present invention.

As used herein, a high pressure feed air compressor can include an air compressor with an output pressure of at least 15 bar(a). Additionally, as used herein, the term "about" can include natural variations that occur and include a generally accepted error range. In certain embodiments, about can include +/−5% of a particular value.

As used herein, the term "about" can include natural variations that occur and include a generally accepted error range. In certain embodiments, about can include +/−5% of a particular value.

As used herein, the phrase "sourced from" is intended to include not only a direct connection, but it is also intended to include instances in which the item being sourced might travel through various intermediaries. As non-limiting examples, the nitrogen that is "sourced from" an ASU can also include instances in which the ASU is connected to a nitrogen pipeline and this pipeline delivers nitrogen to the HLU and/or LIN from the ASU is first stored in a LIN Storage Tank. Additionally, more than one ASU can be connected to the common intermediary and still fall under the phrase "nitrogen stream that is sourced from an air separation unit." This concept also applies to hydrogen sourced from the HGU (i.e., allows for intermediaries). Furthermore, the intermediaries preferably do not substantially alter the chemical nature of the hydrogen or nitrogen.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step or reversed in order.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value.

When such particular value and/or to the other particular value, along with all combinations within said range.

All references identified herein are each hereby incorporated by reference into this application in their entireties, as well as for the specific information for which each is cited.

What is claimed is:

1. An integrated industrial unit comprising:
a nitrogen source configured to provide liquid nitrogen and pressurized gaseous nitrogen;
a hydrogen source configured to provide gaseous hydrogen at a pressure of at least 15 bar(a), wherein the hydrogen source is a hydrogen generation unit;
a hydrogen liquefaction unit, wherein the hydrogen liquefaction unit comprises a precooling system, and a liquefaction system; and
a liquid hydrogen storage tank,
wherein the precooling system is configured to receive the gaseous hydrogen from the hydrogen source and cool the gaseous hydrogen to a temperature between 70K and 100K,
wherein the precooling system comprises a primary refrigeration system and a secondary refrigeration system,
wherein the liquefaction system is in fluid communication with the precooling system and is configured to liquefy the gaseous hydrogen received from the precooling system to produce liquid hydrogen,
wherein the liquid hydrogen storage tank is in fluid communication with the liquefaction system and is configured to store the liquid hydrogen received from the liquefaction system,
wherein the primary refrigeration system provides refrigeration by expansion of the pressurized gaseous nitrogen,
wherein the secondary refrigeration system provides refrigeration by vaporization of the liquid nitrogen,
wherein the nitrogen source is an air separation unit, wherein the air separation unit is configured to produce at least an oxygen stream, the pressurized gaseous nitrogen, and the liquid nitrogen, wherein the air separation unit is in fluid communication with the hydrogen generation unit and the precooling system, such that the air separation unit is configured to send the oxygen stream to the hydrogen generation unit, the pressurized nitrogen gaseous stream to the primary refrigeration system, and the liquid nitrogen to the secondary refrigeration system,
wherein the air separation unit comprises a nitrogen pump configured to pressurize a liquid nitrogen stream from a distillation column system thereof, and a main heat exchanger configured to vaporize said pressurized liquid nitrogen stream to form the pressurized gaseous nitrogen sent to the primary refrigeration system.

2. The integrated industrial unit as claimed in claim 1, further comprising a flow controller configured to control a flow rate of the liquid nitrogen such that the flow rate of the liquid nitrogen from the nitrogen source is between 0 to 80% of a flow rate of the oxygen stream sent to the hydrogen generation unit.

3. The integrated industrial unit as claimed in claim 1, wherein the air separation unit is configured to receive a recycled vaporized nitrogen stream from the hydrogen liquefaction unit.

4. The integrated industrial unit as claimed in claim 1, further comprising a nitrogen recycle compressor in fluid communication with a warm end of the precooling unit, wherein the nitrogen recycle compressor is configured to receive and compress a vaporized nitrogen stream from the warm end of the precooling unit and then send the compressed nitrogen stream to the primary refrigeration system.

5. The integrated industrial unit as claimed in claim 1, wherein the air separation unit comprises a high pressure feed air compressor.

6. The integrated industrial unit as claimed in claim 1, wherein the primary refrigeration system is configured to provide cooling within the precooling system to a first temperature between about 70K and about 120K.

7. The integrated industrial unit as claimed in claim 6, wherein the first temperature is less than about 30K of a vaporization temperature of liquid nitrogen used within the secondary refrigeration system.

8. The integrated industrial unit as claimed in claim 1, wherein the vaporization of liquid nitrogen in the secondary refrigeration system occurs at a vaporization pressure that is equal to or within +/−0.5 bar(a) a discharge pressure of a cold turbine used within the primary refrigeration system.

9. The integrated industrial unit as claimed in claim 1, wherein the air separation unit further comprises an oxygen pump and a nitrogen pump, the oxygen pump being configured to pressurize liquid oxygen, the nitrogen pump being configured to pressurize liquid nitrogen, wherein the oxygen pump and the nitrogen pump are both separately fluidly connected with a main heat exchanger of the air separation unit that is configured to vaporize the liquid oxygen and the liquid nitrogen.

10. An integrated industrial unit comprising:
a nitrogen source configured to provide liquid nitrogen and pressurized gaseous nitrogen;
a hydrogen source configured to provide gaseous hydrogen at a pressure of at least 15 bar(a);
a hydrogen liquefaction unit, wherein the hydrogen liquefaction unit comprises a precooling system, and a liquefaction system; and
a liquid hydrogen storage tank,
wherein the precooling system is configured to receive the gaseous hydrogen from the hydrogen source and cool the gaseous hydrogen to a temperature between 70K and 100K,
wherein the precooling system comprises a primary refrigeration system and a secondary refrigeration system,
wherein the liquefaction system is in fluid communication with the precooling system and is configured to liquefy the gaseous hydrogen received from the precooling system to produce liquid hydrogen,
wherein the liquid hydrogen storage tank is in fluid communication with the liquefaction system and is configured to store the liquid hydrogen received from the liquefaction system,
wherein the primary refrigeration system comprises expanders configured to expand the pressurized gaseous nitrogen, wherein the expanders are configured to have an outlet pressure of $P_1$,
wherein the secondary refrigeration system provides refrigeration to the precooling system by vaporization of the liquid nitrogen at pressure $P_2$, wherein the primary and secondary refrigerants are in fluid communication,
wherein the nitrogen source comprises an air separation unit,
wherein the hydrogen source is a hydrogen generation unit,
wherein the air separation unit is configured to produce at least an oxygen stream, the pressurized gaseous nitrogen, and the liquid nitrogen, wherein the air separation unit is in fluid communication with the hydrogen generation unit and the precooling system, such that the air separation unit is configured to send the oxygen stream to the hydrogen generation unit, the pressurized nitrogen gaseous stream to the primary refrigeration system, and the liquid nitrogen to the secondary refrigeration system,
wherein the pressurized gaseous nitrogen is provided as a first nitrogen product stream from the air separation unit and the liquid nitrogen is provided as a separate, second nitrogen product stream from the air separation unit, wherein the first and second nitrogen product streams are supplied as utilities to the hydrogen liquefaction unit.

11. The integrated industrial unit as claimed in claim 10, wherein $P_1$ is equal to or within +/−0.5 bar(a) of $P_2$.

12. The integrated industrial unit as claimed in claim 10, wherein the air separation unit is configured to produce at least an oxygen stream, the pressurized gaseous nitrogen, and the liquid nitrogen, wherein the air separation unit is in fluid communication with the hydrogen generation unit and the secondary refrigeration system, such that the air separation unit is configured to send the oxygen stream to the hydrogen generation unit, the pressurized gaseous nitrogen to the primary refrigeration system, and the liquid nitrogen to the secondary refrigeration system.

13. The integrated industrial unit as claimed in claim 12, further comprising a flow controller configured to control a flow rate of the liquid nitrogen such that the flow rate of the liquid nitrogen from the nitrogen source is between 0% to 80% of a flow rate of the oxygen stream sent to the hydrogen generation unit.

14. The integrated industrial unit as claimed in claim 10, wherein the primary refrigeration system is configured to provide cooling within the precooling system to a first temperature between about 70K and about 120K.

15. The integrated industrial unit as claimed in claim 14, wherein the first temperature is less than about 30K of a vaporization temperature of liquid nitrogen used within the secondary refrigeration system.

16. The integrated industrial unit as claimed in claim 10, wherein the vaporization of liquid nitrogen in the secondary refrigeration system occurs at a vaporization pressure that is less than a discharge pressure of a cold turbine of the expanders used within the primary refrigeration system.

17. The integrated industrial unit as claimed in claim 10, wherein the air separation unit further comprises an oxygen pump and a nitrogen pump, the oxygen pump being configured to pressurize liquid oxygen, the nitrogen pump being configured to pressurize liquid nitrogen, wherein the oxygen pump and the nitrogen pump are both separately fluidly connected with a main heat exchanger of the air separation unit that is configured to vaporize the liquid oxygen and the liquid nitrogen.

18. The integrated industrial unit as claimed in claim 1, wherein the pressurized gaseous nitrogen is provided as a first nitrogen product stream from the air separation unit and the liquid nitrogen is provided as a separate, second nitrogen product stream from the air separation unit, wherein the first and second nitrogen product streams are supplied as utilities to the hydrogen liquefaction unit.

19. The integrated industrial unit as claimed in claim 10, wherein the air separation unit comprises a nitrogen pump configured to pressurize a liquid nitrogen stream from a distillation column system thereof, and a main heat exchanger configured to vaporize said pressurized liquid nitrogen stream to form the pressurized gaseous nitrogen sent to the primary refrigeration system.

20. An integrated industrial unit comprising:

a nitrogen source configured to provide liquid nitrogen and pressurized gaseous nitrogen;

a hydrogen source configured to provide gaseous hydrogen at a pressure of at least 15 bar(a), wherein the hydrogen source is a hydrogen generation unit;

a hydrogen liquefaction unit, wherein the hydrogen liquefaction unit comprises a precooling system, and a liquefaction system; and a liquid hydrogen storage tank, wherein the precooling system is configured to receive the gaseous hydrogen from the hydrogen source and cool the gaseous hydrogen to a temperature between 70K and 100K, wherein the precooling system comprises a primary refrigeration system and a secondary refrigeration system, wherein the liquefaction system is in fluid communication with the precooling system and is configured to liquefy the gaseous hydrogen received from the precooling system to produce liquid hydrogen, wherein the liquid hydrogen storage tank is in fluid communication with the liquefaction system and is configured to store the liquid hydrogen received from the liquefaction system, wherein the primary refrigeration system provides refrigeration by expansion of the pressurized gaseous nitrogen, wherein the secondary refrigeration system provides refrigeration by vaporization of the liquid nitrogen, wherein the nitrogen source is an air separation unit, wherein the air separation unit is configured to produce at least an oxygen stream, the pressurized gaseous nitrogen, and the liquid nitrogen, wherein the air separation unit is in fluid communication with the hydrogen generation unit and the precooling system, such that the air separation unit is configured to send the oxygen stream to the hydrogen generation unit, the pressurized nitrogen gaseous stream to the primary refrigeration system, and the liquid nitrogen to the secondary refrigeration system wherein the integrated industrial unit further comprises a control system configured to control a flow rate of the liquid nitrogen to the secondary refrigeration system as a function of a flow rate of the oxygen stream sent to the hydrogen generation unit, thereby optimizing the energy balance of the integrated industrial unit.

\* \* \* \* \*